(12) United States Patent
Buchanan et al.

(10) Patent No.: US 11,776,008 B2
(45) Date of Patent: Oct. 3, 2023

(54) CONTEXTUAL PREDICTION SYSTEM AND METHOD

(71) Applicant: Rokt Pte. Ltd., Singapore (SG)

(72) Inventors: Bruce Eaton Buchanan, Brooklyn, NY (US); Stuart James FitzRoy, Artarmon (AU); Scott Matthew Jackson, Baulkham Hills (AU); Kanishka Mohaia, Eastwood (AU); Dinesh Gurram, Baulkham Hills (AU); Yan Xu, Wentworth (AU)

(73) Assignee: ROKT PTE. LTD., Singapore (SG)

( * ) Notice: Subject to any disclaimer, the term of this patent is extended or adjusted under 35 U.S.C. 154(b) by 0 days.

(21) Appl. No.: 16/822,730

(22) Filed: Mar. 18, 2020

(65) Prior Publication Data

US 2021/0295382 A1    Sep. 23, 2021

(51) Int. Cl.
*G06Q 30/00*     (2023.01)
*G06Q 30/0251*   (2023.01)
*G06F 16/9535*   (2019.01)
*G06N 5/04*      (2023.01)
*G06N 20/00*     (2019.01)

(52) U.S. Cl.
CPC ..... *G06Q 30/0253* (2013.01); *G06F 16/9535* (2019.01); *G06N 5/04* (2013.01); *G06N 20/00* (2019.01); *G06Q 30/0269* (2013.01)

(58) Field of Classification Search
None
See application file for complete search history.

(56) References Cited

U.S. PATENT DOCUMENTS

| | | | | |
|---|---|---|---|---|
| 7,987,195 | B1* | 7/2011 | Li | G06F 16/9537 707/765 |
| 9,830,304 | B1* | 11/2017 | Simeonov | G06F 40/103 |
| 10,963,871 | B2* | 3/2021 | Safak | G06Q 20/34 |
| 2002/0073177 | A1* | 6/2002 | Clark | G06Q 30/06 709/219 |
| 2005/0197893 | A1* | 9/2005 | Landau | G06Q 30/0222 705/14.13 |
| 2009/0271250 | A1* | 10/2009 | Sriver | G06Q 30/0613 705/26.1 |

(Continued)

*Primary Examiner* — Luis A Brown
(74) *Attorney, Agent, or Firm* — Baker Botts L.L.P.

(57) ABSTRACT

Disclosed herein are a content provisioning platform (150) and a system (100) that utilizes such a content provisioning platform (150). The content provisioning platform (150) includes: a selection engine (153) for selecting, in response to a request from a webpage (300) associated with an electronic transaction, inventory based on at least one of: a contextual attribute associated with the electronic transaction, a customer attribute associated with a user performing the electronic transaction, and a set of predefined rules. The inventory is selected from available inventory derived from at least one inventory provider during the electronic transaction. The webpage (300) is encoded in accordance with a content provisioning application programming interface (API) (140) associated with the content provisioning platform (150), the webpage including a contextual content display region (350) for displaying the selected inventory. The content provisioning API (140) is adapted to deliver the selected content to the contextual content display region (350).

18 Claims, 8 Drawing Sheets

(56) References Cited

U.S. PATENT DOCUMENTS

| | | | |
|---|---|---|---|
| 2010/0082472 A1* | 4/2010 | Cheung | G06Q 40/04 705/37 |
| 2011/0054997 A1* | 3/2011 | Feuerstein | G06Q 30/0255 705/14.42 |
| 2011/0264513 A1* | 10/2011 | Ratnaparkhi | G06Q 30/0246 705/14.45 |
| 2012/0054027 A1* | 3/2012 | McAfee | G06Q 30/0251 705/14.49 |
| 2012/0150666 A1* | 6/2012 | Savic | G06Q 30/0283 705/26.41 |
| 2013/0268408 A1* | 10/2013 | Mebed | G06Q 30/0623 705/26.62 |
| 2014/0164102 A1* | 6/2014 | Bell | G06Q 30/0255 705/14.45 |
| 2014/0214536 A1* | 7/2014 | Silva | G06Q 30/0251 705/14.53 |
| 2014/0379458 A1* | 12/2014 | Bell | G06Q 30/0242 705/14.66 |
| 2015/0006295 A1* | 1/2015 | Liu | G06Q 30/0269 705/14.66 |
| 2016/0029368 A1* | 1/2016 | Borenstein | H04W 72/563 709/205 |
| 2016/0189248 A1* | 6/2016 | Boyle | G06F 40/143 705/14.73 |
| 2017/0262897 A1* | 9/2017 | Bell | G06Q 30/0242 |
| 2018/0260840 A1* | 9/2018 | Jeon | H04L 67/22 |
| 2018/0308133 A1* | 10/2018 | Geist, Jr. | G06Q 30/0271 |
| 2019/0080363 A1* | 3/2019 | Acuna Agost | G06N 7/01 |
| 2020/0104879 A1* | 4/2020 | Christensen | G06Q 30/02 |
| 2020/0177466 A1* | 6/2020 | Rossi | G06N 5/01 |
| 2020/0226496 A1* | 7/2020 | Basu | G06N 5/01 |
| 2020/0273092 A1* | 8/2020 | Wilson | G06T 19/003 |
| 2021/0056588 A1* | 2/2021 | Kim | G06Q 30/0251 |

* cited by examiner

CONTEXTUAL PREDICTION SYSTEM AND METHOD

TECHNICAL FIELD

The present disclosure relates to a contextual prediction system. In particular, the present disclosure relates to a content provisioning platform system for delivering contextually relevant content during an electronic transaction.

BACKGROUND

Electronic commerce, commonly known and referred to as e-commerce, relates generally to commercial transactions performed using communications networks, such as the Internet. The commercial transactions may be referred to as electronic transactions and typically relate to one of: online retailing, electronic markets, and online auctions.

A number of different technologies may be utilized to complete an e-commerce transaction, depending on the nature of the transaction and the computing devices utilized by the different parties involved in the transaction. For example, a vendor may utilize a web page of the World Wide Web to promote goods and services for sale. The web page may be connected to an inventory management system that presents information indicating the number of items available at various store locations. The server hosting the web page may also incorporate or otherwise be associated with a check-out system for managing items placed by a browsing user into a virtual cart, as well as a payment gateway for effecting electronic funds transfer from the user in order to complete a purchase order relating to the goods in the virtual cart.

In more recent times, online shopping has taken advantage of other technologies, such as live chat and chat bots or virtual assistants, to assist a consumer through an online transaction.

Online retailers seek to promote their goods and services to consumers that are likely to make purchases, often using subscription services to send emails or notifications within software applications ("apps") associated with the retailers.

In order to determine how effective online advertising is, retailers measure click-through rates, which measure the percentage of users that click on an advertisement presented in an online display to visit a website or landing page. Many advertising platforms determine a quality score for an advertisement based on the click-through rates. However, click-through rates alone do not provide an indication of how successful an advertisement is in securing a sale. A conversion rate is a metric, typically shown as a percentage, that indicates what proportion of visitors to a page complete an action.

Online retailers and service providers seek to add value during an electronic transaction to increase the value of the consumer. The value of the consumer is not limited to an amount spent during a single transaction. Rather, the value of the consumer depends on the revenue of the current transaction and the margin of that transaction, as well as the life time value of other actions performed by that consumer. Such other actions may include, for example, signing up to a loyalty program, downloading an associated software application, and the like. One approach is to deliver contextually relevant material to consumers in order to secure online sales, wherein the contextually relevant material may be directed to brands or products likely to be of interest to the consumer. However, existing approaches have limited context for the user browsing a website. Consequently, the website often displays content that may have little or no relevance to the browsing user. There is a difficulty in recognizing context-based patterns in user behaviour, in order to predict intelligently which content is most likely to be contextually relevant.

Thus, a need exists to provide a contextual prediction system for providing contextually relevant content during an electronic transaction.

SUMMARY

The present disclosure relates to a contextual prediction system for delivering contextually relevant content during an electronic transaction.

A first aspect of the present disclosure provides a content provisioning platform comprising:
 a selection engine for selecting, in response to a request from a webpage associated with an electronic transaction, inventory based on at least one of: a contextual attribute associated with said electronic transaction, a customer attribute associated with a user performing said electronic transaction, and a set of predefined rules;
 wherein said inventory is selected from available inventory derived from at least one inventory provider during the electronic transaction; and
 wherein said webpage is encoded in accordance with a content provisioning application programming interface (API) associated with said content provisioning platform, said webpage including a contextual content display region for displaying said selected inventory and said content provisioning API being adapted to deliver said selected content to said contextual content display region.

A second aspect of the present disclosure provides a content provisioning system comprising:
 a content provisioning API;
 a server for conducting an electronic transaction with a user via a website, said website displaying a webpage encoded in accordance with said content provisioning API and including a contextual content display region;
 an inventory provider; and
 a content provisioning platform including:
  a selection engine for dynamically selecting, in response to a request from said webpage during said electronic transaction, inventory based on at least one of: a contextual attribute associated with said electronic transaction, a customer attribute associated with a user performing said electronic transaction, and a set of predefined rules;
  wherein said inventory is selected from available inventory derived from said inventory provider during the electronic transaction; and
  wherein said content provisioning API is associated with said content provisioning platform and delivers said selected content to said contextual content display region of said webpage.

According to another aspect, the present disclosure provides a method for delivering contextually relevant content during an electronic transaction.

According to another aspect, the present disclosure provides an apparatus for implementing any one of the aforementioned methods.

According to another aspect, the present disclosure provides a computer program product including a computer readable medium having recorded thereon a computer program that when executed on a processor of a computer implements any one of the methods described above.

Other aspects of the present disclosure are also provided.

BRIEF DESCRIPTION OF THE DRAWINGS

One or more embodiments of the present disclosure will now be described by way of specific example(s) with reference to the accompanying drawings, in which.

Method steps or features in the accompanying drawings that have the same reference numerals are to be considered to have the same function(s) or operation(s), unless the contrary intention is expressed or implied.

DETAILED DESCRIPTION

Figure 1:
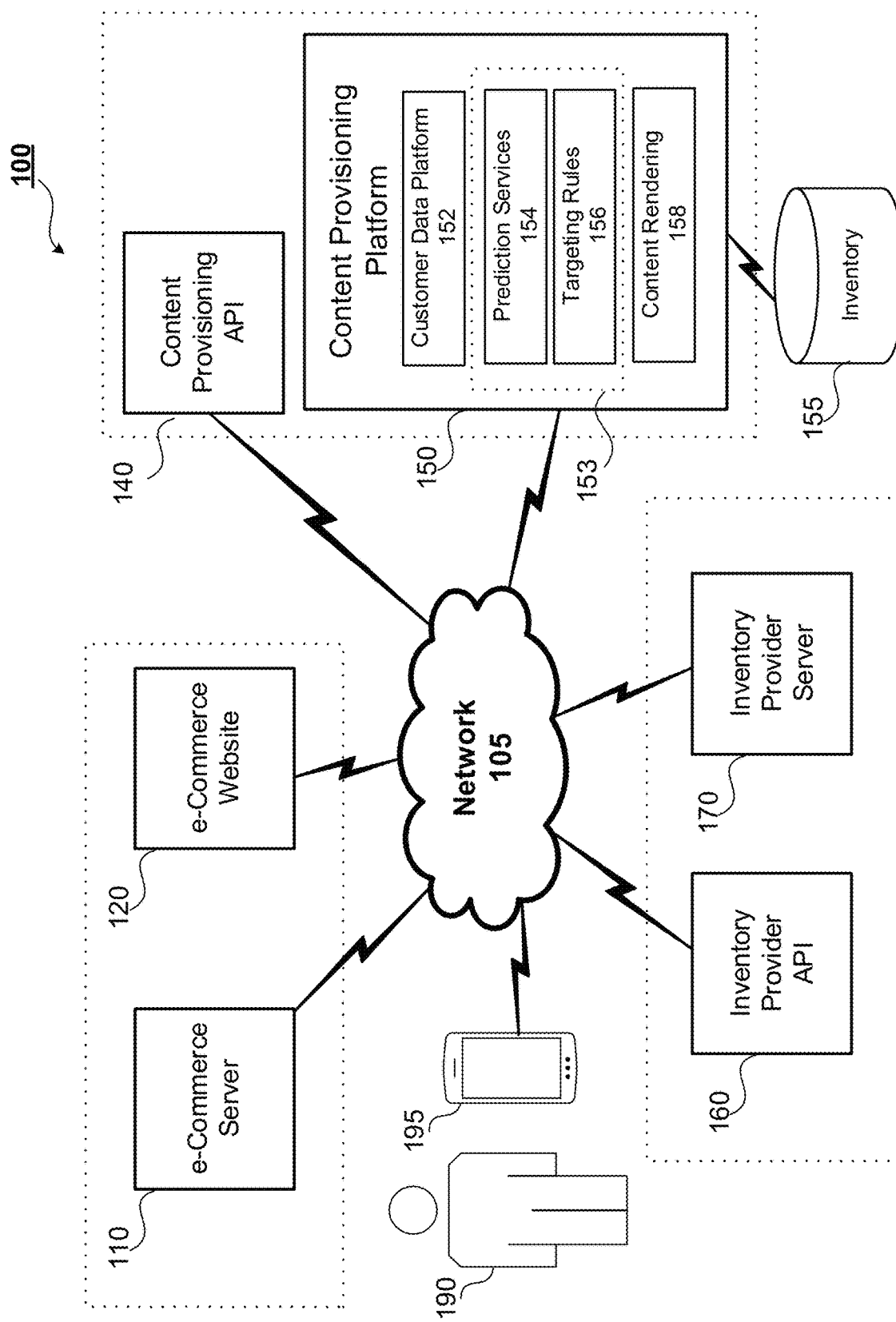
FIG. 1 is a schematic representation of a system on which one or more embodiments of the present disclosure may be practised.

The present disclosure provides a contextual prediction system and method based on a content provisioning platform. The contextual prediction system manages a transaction flow during an electronic transaction being performed on an e-commerce website associated with an e-commerce server to deliver contextually relevant content to a display of a user computing device in a dynamic manner.

A user utilizes the user computer device to view the e-commerce website, browse among the goods on offer, and select goods for purchase. While examples and embodiments may describe goods being offered by an e-commerce website, it will be appreciated that the goods may be products or services and that the term "goods" is used in this specification for the sake of clarity. The transaction system utilizes a combination of a widget encoded within a webpage of the e-commerce website, a software development kit (SDK) and application programming interface (API) to enable the e-commerce website to interact with a content provisioning platform and inventory provider to deliver contextually relevant content in a dynamic manner during electronic transactions.

A widget is an element of a graphical user interface (GUI) that displays information or provides a predefined manner by which a user is able to interact with an application or website. Widgets may take a number of forms that include, but are not limited to, buttons, pull-down menus, selection boxes, progress indicators, on-off checkmarks, scroll bars, windows, window resizing tools, toggle buttons, and the like for displaying information and for inviting, accepting, and responding to user inputs.

The content provisioning platform derives available inventory from one or more inventory providers during an electronic transaction being performed on an e-commerce website and selects contextually relevant content for display on the e-commerce website. Selection of the contextually relevant content is performed by a selection engine of the content provisioning platform, wherein the selection engine selects contextually relevant content based on at least one of context attributes associated with the electronic transaction, consumer attributes associated with the user performing the electronic transaction, and a predefined set of rules associated with the electronic transaction.

In some embodiments, the content provisioning platform selects contextually relevant content based on available inventory. In the context of this application, inventory refers to any goods (i.e., products or services) that may be offered to a consumer during an electronic transaction. Inventory is to be construed broadly and is not restricted to tangible goods that are physically in stock. Inventory available for an electronic transaction is made available by one or more inventory providers, the content provisioning platform, or a combination thereof.

Available inventory may include, but is not limited to, offers relating to further goods, actions relating to the electronic transaction, and the like. Actions relating to the electronic transaction may include, for example, printing, emailing, or texting a copy of a receipt. In an example in which the electronic transaction relates to purchasing concert tickets, available inventory may include printing, emailing, or texting copies of the purchased concert tickets. Further actions relating to the electronic transaction may include, for example, reminders to be sent regarding further goods. For example, a further action relating to an electronic transaction may be an option to have a reminder sent by email, text, or in-app notification in relation to goods offered by one or more inventory providers. In the scenario described above in which the electronic transaction relates to purchasing concert tickets, available inventory may include an option for the consumer to have an email reminder sent a predefined period of time before the concert is to take place, wherein the email reminder relates to parking, merchandise, or other goods.

Selection of the contextually relevant content may relate not only to available inventory, but optionally also to the creatives and user experience associated with the available inventory. That is, selection of the contextually relevant content optionally includes determination of characteristics of how the selected inventory is to be displayed to the user, such as the type of widget, the look and feel, size, and orientation of the contextual content region, and the language and creative text and graphics used to convey the selected inventory.

FIG. 1 is a schematic block diagram representation of a contextual prediction system 100. The system 100 includes an e-commerce server 110 that is coupled to a communications network 105. The communications network 105 may be implemented using one or more wired or wireless transmission links and may include, for example, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a mobile telephone cellular network, a short message service (SMS) network, or any combination thereof. The e-commerce server 110 is a host server that offers products for sale via an associated e-commerce website 120. It will be appreciated that the e-commerce website 120 may be hosted on the e-commerce server 110 or on a separate web-hosting service.

The system 100 also includes a content provisioning platform 150 that is coupled to the communications network 105. The content provisioning platform 150 is configured to source inventory to be provided dynamically for display on the e-commerce website 120 during an electronic transaction, based on contextual information associated with that electronic transaction.

The contextual information depends on the implementation and may include, for example, but is not limited to, consumer attributes, context attributes, or a combination thereof. Consumer attributes are attributes associated with a consumer that is effecting the transaction and may include, for example, age, sex, geographical location, computing device type, browser type, and the like. Context attributes may include, for example, product type, purchase date, purchase time, product location, and the like. Due to the interaction between the content provisioning platform 150 and the e-commerce server 110, the e-commerce server 110 may also be referred to as a partner server 110 and the associated e-commerce website 120 may be referred to as a partner website 120.

The content provisioning platform 150 has an associated content provisioning API 140. Depending on the implementation, the content provisioning API 140 may be integral with or co-located on the content provisioning platform 150. Alternatively, as shown in FIG. 1, the content provisioning API 140 is hosted separately from the content provisioning platform 150, such as on Amazon Web Services (AWS), Google Cloud Platform, or similar hosting platform. In one implementation, the content provisioning API 140 is hosted on AWS with multi-region deployment to provide greatest uptime and availability for the content provisioning API 140. The content provisioning platform 150 exchanges data with the content provisioning API 140 via the communications network 105.

In the example of FIG. 1, the content provisioning server 150 is coupled to an optional local inventory database 155. The local inventory database 155 stores information about local inventory that may be provided by the content provisioning platform 150 as contextually relevant content during an electronic transaction performed using the e-commerce server 110.

The system 100 further includes an inventory provider server 170 and an associated inventory provider API 160, which may be hosted on the inventory provider server 170 or, as shown in FIG. 1, hosted separately. The inventory provider API 160 and inventory provider server 170 exchange data via the communications network 105. The inventory provider server 170 provides inventory for the content provisioning platform 150 to provide to the e-commerce server 110. Inventory provided by the inventory provider server 170 are additional goods that may be offered for sale to a user 190 making an electronic transaction via a user computing device 195, such as parking for a concert venue, ticket insurance, merchandise, and the like.

The content provisioning platform 150 includes a customer data platform (CDP) 152, a prediction services module 154, a targeting rules module 156, and a content rendering module 158. The CDP 152 stores customer attributes gathered from customer registrations, third-party websites, and transactions made using the e-commerce server 110 and e-commerce website 120.

The prediction services module 154 and targeting rules module 156 together form a selection engine 153 that determines what content is to be presented during an electronic transaction. In some embodiments, the selection engine 153 receives from the e-commerce server 110 transaction data, consumer data, or a combination thereof, and utilizes the received transaction data and/or consumer data to select contextually relevant content to be presented during the electronic transaction. The transaction data includes one or more contextual attributes associated with the electronic transaction. Depending on the implementation, the received transaction data and/or consumer data are used by either one or both of the prediction services module 154 and the targeting rules module 156.

The targeting rules module 156 applies rules to select contextually relevant content from the available inventory, wherein the contextually relevant content is to be provided by the content provisioning platform 150 to the e-commerce server 110 and e-commerce website 120 during an electronic transaction. The rules may be set by the e-commerce server 110 or the content provisioning platform 150, or a combination thereof.

The prediction services module 154 acts to select contextually relevant content based on the likelihood of the consumer to engage, along with the value of the engagement. In some embodiments, the prediction services module 154 receives transaction data and/or consumer data from the e-commerce server 110 in order to improve selection of contextually relevant content from available inventory provided by the local inventory database 155 and the inventory provider server 170. In some arrangements, the prediction services module 154 is implemented using machine learning. Depending on the implementation, different machine learning models may be utilized, including, for example, but not limited to, linear regression and lightGBM. In alternative arrangements, the prediction services module 154 randomly selects options or utilizes fixed logic models. Such fixed logic models may be coded, for example, to select options based on fixed probabilities or branching logic (e.g., If . . . Then statements). In some arrangements in which the prediction services module 154 is implemented to randomly select options from available inventory, the prediction services module 154 utilizes a pseudo-random generator to make the random selections.

In some embodiments, the targeting rules module 156 applies a hard filter to available inventory, based on a set of predefined rules, received transaction data, received consumer data, or any combination thereof. Results of the filtered inventory are then passed from the targeting rules module 156 to the prediction services module 154. In other embodiments, the prediction services module 154 acts first on the available inventory, with the results passed from the prediction services module 154 to the targeting rule module 156.

For example, the e-commerce server 110 may provide a set of predefined rules such that contextually relevant content to be provided by the content provisioning platform 150 to the e-commerce website 120 during an electronic transaction must match a predefined demographic, a predefined product type, a predefined price range, or any combination thereof. In some embodiments, an operator of the e-commerce server 110 provides the content provisioning platform 150 with a set of predefined rules. In one example, the rules may include: show only parking for venues A, B and C; do not show content relating to offers of further goods to high value customers; do not show content relating to offers of further goods to a predefined audience; only show content relating to offers of further goods to males, aged 25-45, on ticketing sites; and/or only show inventory relating to actions relating to the electronic transaction to a predefined audience. A predefined audience may be customised by the operator of the e-commerce server 110 to include, for example, a particular demographic, associated service providers, or a combination thereof. The targeting rules module 156 applies the predefined rules to filter available inventory.

The content rendering module 158 formats the way in which selected inventory is to be presented, as contextually relevant content, on a webpage of the e-commerce website 120. In some embodiments, the content rendering module 158 stores data that determines how content is to be rendered on the e-commerce website 120. Such data may include, for example, but is not limited to, campaign meta data, creatives, UX formats, UX designs, and the like. Depending on the particular implementation and application, the content rendering module 158 may store data relating to a number of different options (e.g., layouts A,B,C; creatives X,Y,Z) from which the selection engine 153 can choose. In some embodiments, the stored data includes default text, images, audio content, or any combination thereof, that is to be presented in association with the selected inventory.

The user 190 utilizes the computing device 195 coupled to the communications network 105 to interact with the e-commerce website 120. The computing device 195 shown in the example of FIG. 1 is a smartphone, but may equally be implemented using a personal computer, tablet computing device, phablet, or the like. The user 190 utilizes one or more input devices on the computing device 195, such as a keyboard, mouse, or touchscreen, to navigate pages of the e-commerce website 120. The user 190 is thus able to view goods offered for sale by the e-commerce server 110 via the e-commerce website 120.

In this example, the goods offered for sale by the e-commerce server 110 are concert tickets. The user 190 browses a selection of concert tickets offered for sale on the e-commerce website 120, selects a set of concert tickets to purchase, and adds the selected concert tickets to a virtual shopping cart. When the user 190 decides to complete the purchase of the selected concert tickets, the user 190 activates a "Checkout" button and the e-commerce website 120 notifies the e-commerce server 110 that the user 190 wants to proceed to the checkout and complete the purchase of the selected concert tickets.

Figure 2:
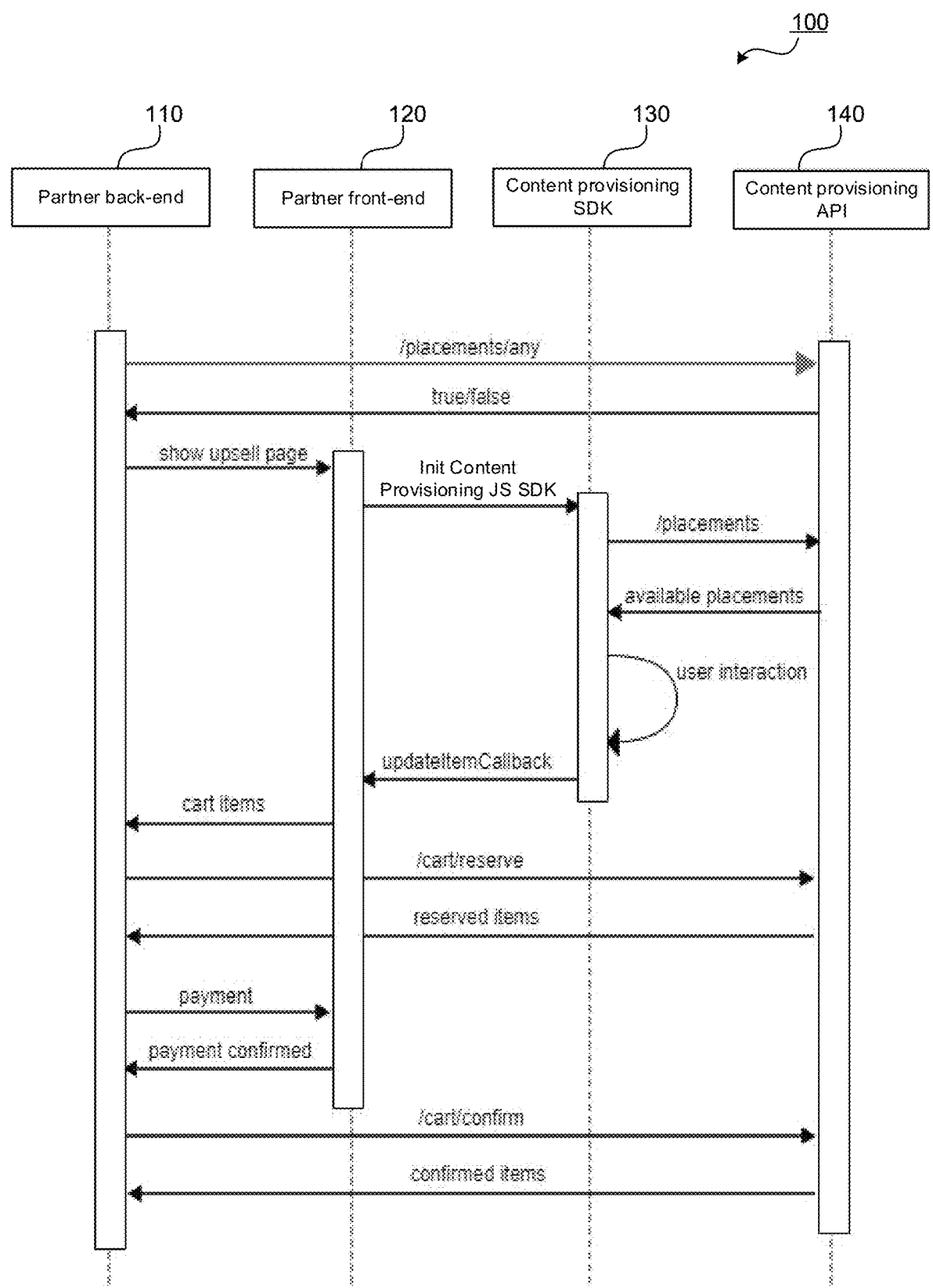
FIG. 2 is a schematic representation illustrating information flow within a contextually relevant content system during an electronic transaction.

FIG. 2 is a schematic representation of information flow within the contextually relevant transaction system 100. The partner back end, corresponding to the e-commerce server 110, sends a request to the content provisioning API 140 asking if there is any inventory to be presented during the electronic transaction checkout process. In response to the request, the content provisioning API 140 returns a true or false indication, based on whether or not there is available inventory from the local inventory database 155 or the inventory provider server 170.

The e-commerce server 110 then delivers to the e-commerce website 120 an upsell webpage to be displayed to the user 190, wherein the upsell webpage provides a summary of the proposed purchase. The upsell webpage also includes a predefined contextual content region in which to display dynamically curated inventory provided by the content provisioning platform 150.

Figure 3:
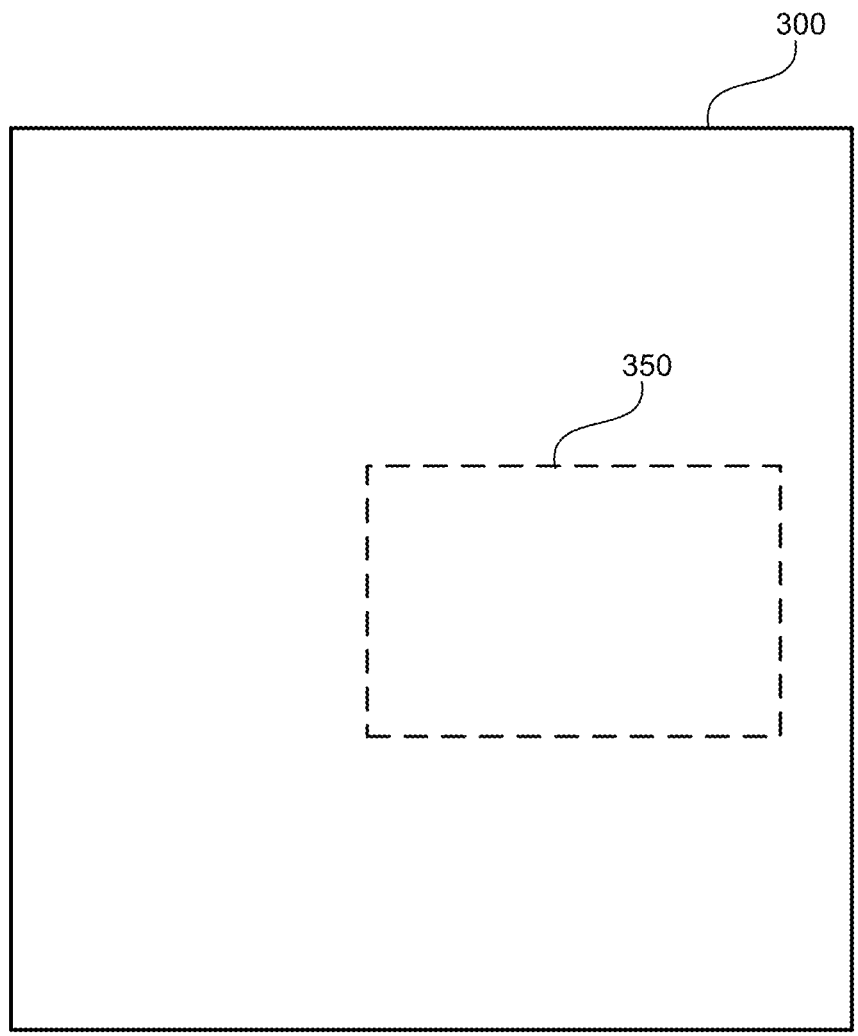
FIG. 3 is a schematic block diagram representation of an upsell page with an integrated contextual content region in which to display a widget.

FIG. 3 is a schematic representation of an upsell page 300 that includes a predefined contextual content region 350 in which to display contextually relevant content. The upsell page 300 is coded to include an embedded link to an SDK associated with the content provisioning platform 350, so that the upsell page 300 knows how to render a widget that is to be displayed in the contextual content region 350. In one example, the widget is a spinner widget that displays one or more inventory items based on decision making performed by the content provisioning platform 150. A spinner is a graphical GUI widget that allows a user to modify a value in an adjacent text box by clicking an up or down arrow, or holding the up or down arrow, thereby allowing the value to increase or decrease. The spinner in this example enables the user to select one or more parking spots to be purchased in conjunction with the concert tickets that are being purchased.

When the upsell page 300 is to be displayed, the e-commerce website 120, referred to in FIG. 2 as the partner front-end, activates an embedded content provisioning SDK 130 that sends a request to the content provisioning API 140 for inventory placements to be displayed in the contextual content region 350. The content provisioning API 140 responds by sending a set of available inventory items (i.e., placements) to be displayed to the user 190 on a display of the user computing device 195. That is, the content provisioning API 140 is adapted to deliver the selected set of inventory items to be displayed in the contextual content region 350 of the upsell page 300, for viewing by the user 190 on a display of the user computing device 195.

The user 190 interacts with the available placements displayed in the widget that appears in the contextual content region 350 in order to select one or more of the inventory items. The widget returns inventory selection information back to the e-commerce website 120, which then informs the e-commerce server 110 of the cart items selected by the user 190 based on the presented inventory items.

The e-commerce server 110 sends a reservation request to the content provisioning API 140 to reserve the selected inventory items. The content provisioning API 140 returns a reservation notification to the e-commerce server 110. The e-commerce server 110 handles payment from the user 190 to progress the electronic transaction, such as by utilizing a payment gateway or the like, by presenting a user interface to the e-commerce website 120 to obtain relevant user payment details and receiving a payment confirmation from the e-commerce website 120. On receipt of the payment confirmation from the e-commerce website 120, the e-commerce server 110 sends a confirmation message to the content provisioning API 140. The content provisioning API 140 takes appropriate steps to secure the selected inventory items by sending an inventory purchase request to the inventory provider server 170 and receiving a reservation response from the inventory provider server 170. The content provisioning API 140 then sends a confirmation notification back to the e-commerce server 110 to complete the electronic transaction. The confirmation notification includes data relating to the inventory purchase, such as, for example, total price, booking identifier, and the like.

One example of a contextually relevant transaction system and method relates to a checkout process of an online transaction, such as the purchase of tickets to attend a concert. In this example, the user 190 utilizes a browser executing on the computing device 195 coupled to the Internet to interact with the e-commerce website 120 to search for tickets for the concert and add the selected tickets to an online shopping cart. The user computing device 195 may be, for example, a smartphone, personal computer, laptop, tablet computing device, phablet, or the like.

Once the user identifies and selects a concert and adds a number of tickets to a shopping cart provided during the checkout process of the e-commerce website 120, the e-commerce website 120 displays to the user contextually relevant information, which in the example of FIG. 1 is the option to purchase parking at a venue close to the concert venue.

The contextually relevant transaction system 100 provides a technical solution by which the e-commerce server 110 and e-commerce website 120 are able to present contextually relevant content to the user in a dynamic, real-time or near real-time manner during the checkout process of the electronic transaction, based on integration between the e-commerce server 110, the e-commerce website 120, the content provisioning API 140, content provisioning SDK 130, content provisioning widget displayed in the contextual content region 160, content provisioning platform 150, and inventory provider API 160.

In the example of FIG. 1, the e-commerce server 110 seeks to add value to the purchase of goods, in the form of concert tickets, by offering contextually relevant offers to the user during the checkout process. The contextually relevant offers are selected by the content provisioning platform 150 based on the CDP 152, the prediction services module 154, and the targeting rules module 156. The e-commerce server 110 provides a set of rules to the content provisioning platform 150 and the content provisioning platform 150 applies the set of rules to filter inventory that is available from the inventory provider server 170 and the local inventory database 155. For example, the set of rules may define a geographical range for inventory, based on a venue for which the concert tickets are being purchased. The set of rules depend on the implementation and may be directed to particular product types.

The content provisioning server 150 utilizes the context of what type of goods are being purchased by the user 190, along with any consumer attributes that are known about the user 190 to select contextually relevant content for the user 190 in a dynamic manner during an electronic transaction. The nature and extent of any consumer attributes may depend on whether the content provisioning platform 150 is able to recognize the device type of the user computing device 195 and whether the user 190 is logged in to the e-commerce server 110. If the user 190 is logged in to the e-commerce server 110, then the e-commerce server 110 will have consumer attributes associated with the user 190 in a user profile, whereby the e-commerce server 110 is able to transmit some or all of the consumer attributes to the content provisioning platform 150. When the content provisioning platform 150 is able to recognize a device type of the user computing device 195, the content provisioning platform 150 is able to select a campaign or format best suited to that device type, thus improving the chances that the content displayed in the widget will appeal to the user 190.

In this scenario, the e-commerce server 110 has identified that people attending a concert may be interested in booking parking for that concert venue and sends a request to the content provisioning platform 150 asking for available parking inventory. The request is optionally associated with a set of rules, such as the parking inventory must be located within a predefined geographical distance of the concert venue (e.g., 2 miles). In response to the request, the content provisioning platform 150 sends a query to the inventory provider server 170 asking for available car parking inventory. The content provisioning platform 150 then determines which, if any, of the available car parking inventory is to be provided to the e-commerce website 120, based on the set of rules.

When the content provisioning platform 150 determines that selected car parking inventory is to be provided to the e-commerce website 120, the prediction services module 154 determines how to present the selected car parking inventory on the e-commerce website. In some arrangements, this determination includes, for example, selecting a form of widget to be displayed in the contextual content region 350 of the upsell webpage 300, defining the size of the contextual content region 350, defining co-ordinates on the upsell webpage 300 for where the contextual content region is to be displayed, or any combination thereof.

In some arrangements, this determination includes selecting a creative form or other attributes to define a contextually relevant user experience (UX) to the user 190. When the content provisioning platform 150 determines that there is no inventory available that satisfies the set of rules, the content provisioning platform 150 optionally sends default content to be displayed in the contextual content region 350 or sends an instruction to the e-commerce website 120 not to display anything in the contextual content region 350.

Figure 4:
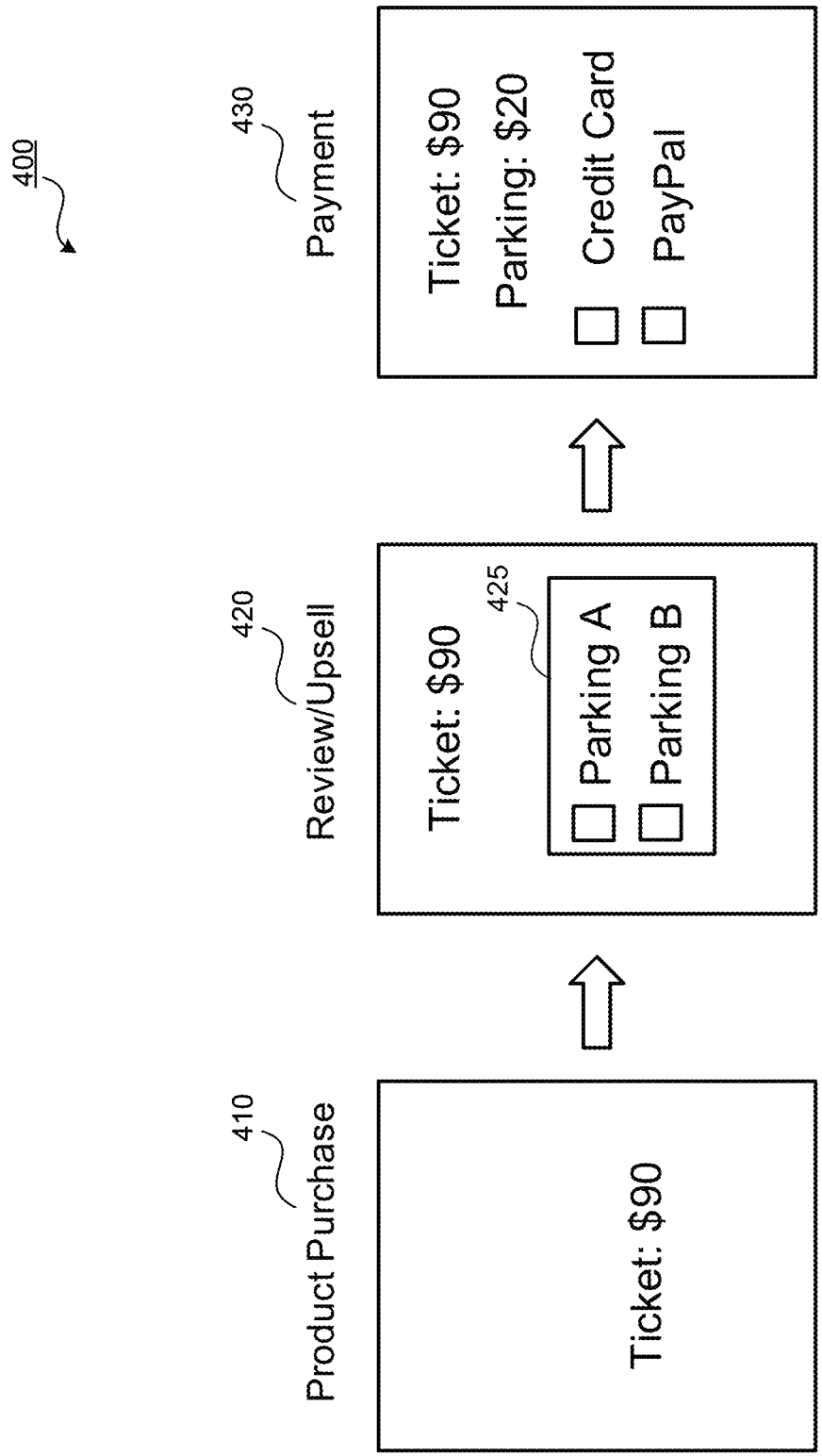
FIG. 4 is a schematic block diagram representation of a checkout process associated with an electronic transaction.

FIG. 4 is a schematic block diagram representation of a checkout process 400 associated with an electronic transaction. The process 400 includes a product purchase stage 410 in which a consumer selects goods, in the form of a ticket, to be purchased. In relation to the example of FIG. 1, the ticket may be for a concert and having placed the ticket in the shopping cart and selected a "checkout" button, control passes to a review/upsell stage 420.

In the review/upsell stage 420, the integration of the e-commerce server 110 with the content provisioning API 140 and content provisioning SDK 130 results in the display to the consumer of dynamic, contextually relevant content in the form of a widget 425. The contextually relevant content relates to inventory that the content provisioning platform 150 has determined is available from the inventory provider 170, then filtered based on a set of selection rules, and applied the prediction services module 154 to select a particular creative and content relating to the inventory. In this example, the contextually relevant content is inventory presented as a widget in the form of an offer of two different parking options, Parking A and Parking B, that is displayed in a region of a display 425 of a computing device accessed by the consumer. The user 190 is able to interact with the widget to select either of Parking A or Parking B. Control then passes to a final payment stage 430 in which the consumer selects a payment method, which in this example is a selection between a credit card payment and PayPal.

Figure 5:
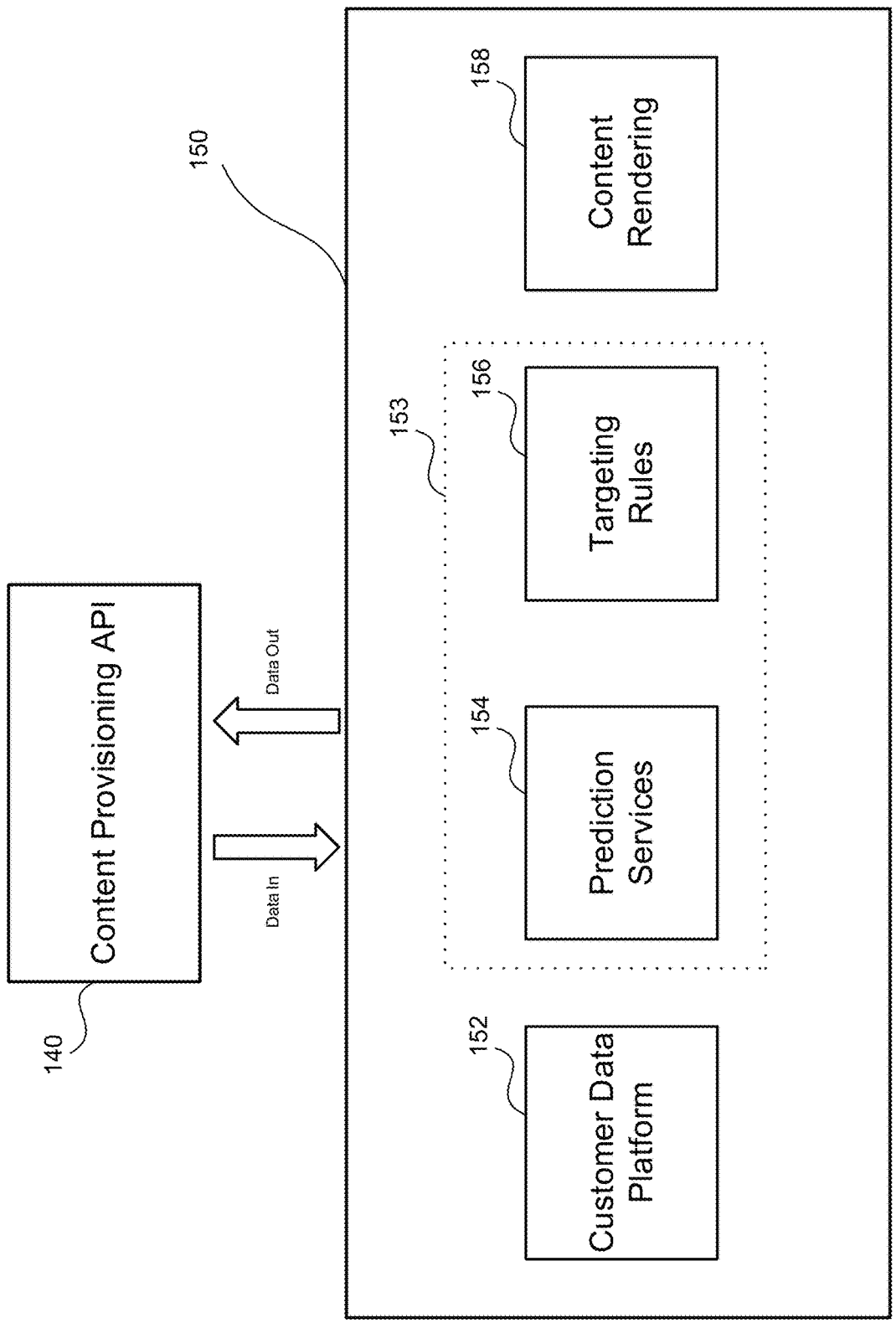
FIG. 5 is a schematic block diagram representation of a content provisioning platform of FIG. 1.

FIG. 5 is a schematic block diagram representation of the content provisioning platform 150 of FIG. 1. As described above in relation to FIG. 1, the content provisioning platform 150 includes the customer data platform (CDP) 152, the prediction services module 154, the targeting rules module 156, and the content rendering module 158. The content provisioning platform 150 receives data from the content provisioning API 140 and sends data out to the content provisioning API 140. The content provisioning platform 150 also exchanges data with the inventory provider server 170 and the e-commerce server 110.

The CDP 152 requires real time ingestion, processing and segmentation of consumer and transaction data to help provide the selection engine 153 with relevant information to inform decisions. Such consumer and transaction data may include, for example, but is not limited to, interaction history for that particular customer, and contextual and consumer demographic attributes to identify micro segments of similar customers which can be used to inform selection.

As described above with reference to FIG. 1, the targeting rules module 156 implements a filtering service based on hard rules defined by an e-commerce partner, the content provisioning platform 150, an inventory provider, or any combination thereof. Hard rules can be applied to consumer or transaction context, or both, depending on the implementation.

The prediction services module 154 selects content based on the likelihood of the consumer to engage along with the value of the engagement, when comparing alternatives, with the objective of maximising value of the transaction. The value may not be directly related to the revenue or profit associated with the transaction itself, but may relate to a longer term value of the consumer resulting from the transaction.

Figure 6:
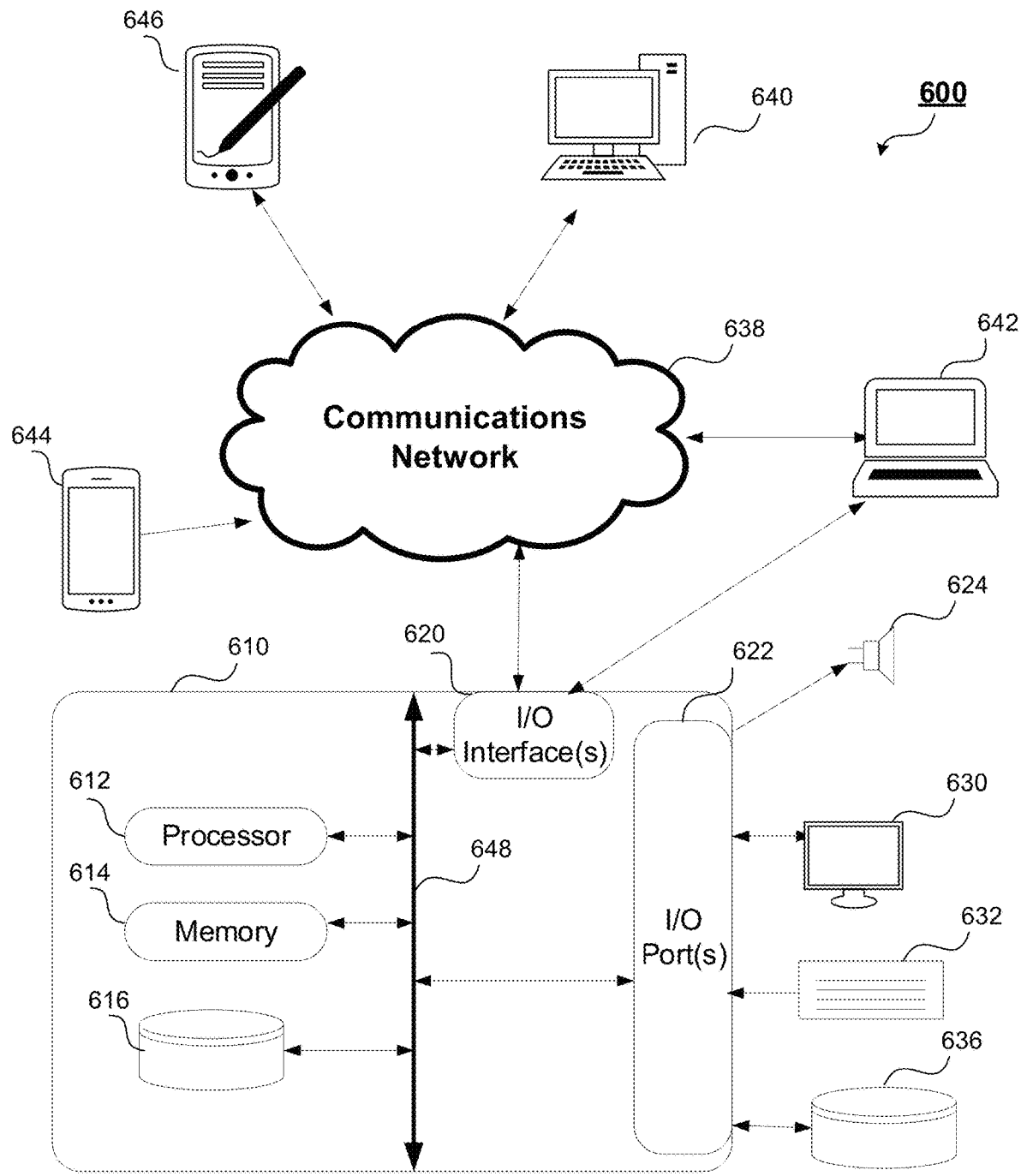
FIG. 6 is a schematic block diagram representation of a system that includes a general purpose computer on which one or more embodiments of the present disclosure may be practised.

The contextually relevant content provisioning system of the present disclosure may be practised using a computing device, such that when implemented in accordance with the present disclosure gives rise to an improved computing system for providing contextually relevant content during an electronic transaction. FIG. 6 is a schematic block diagram representation of a system 600 that includes a general purpose computer 610. The general purpose computer 610 includes a plurality of components, including: a processor 612, a memory 614, a storage medium 616, input/output (I/O) interfaces 620, and input/output (I/O) ports 622. Components of the general purpose computer 610 generally communicate with each other using one or more buses 648.

The processor 612 may be implemented using any device or portion of a device that processes electronic data (e.g., from registers and/or memory to transform that electronic data into other electronic data that may be stored in registers and/or memory). The processor 612 may be representative of one or more processors operating individually, sequentially, or in parallel. The processor 612 may execute code to perform inventory selection, including the application of predefined rules and selection of creatives, in order to deliver contextually relevant content during an electronic transaction.

The memory 614 may be implemented using Random Access Memory (RAM), Read Only Memory (ROM), or a combination thereof. The storage medium 616 may be implemented as one or more of a hard disk drive, a solid state "flash" drive, an optical disk drive, or other storage means. The storage medium 616 may be utilized to store one or more computer programs, including an operating system, software applications, and data. In one mode of operation, instructions from one or more computer programs stored in the storage medium 616 are loaded into the memory 614 via the bus 648. Instructions loaded into the memory 614 are then made available via the bus 648 or other means for execution by the processor 612 to implement a mode of operation in accordance with the executed instructions. The memory 614 may also be utilized to store consumer attributes, context attributes, and the set of predefined rules for inventory selection. When the prediction services module 154 is implemented using machine learning, the memory 614 may be utilized to store one or more machine learning models, fixed logic models, or a combination thereof.

One or more peripheral devices may be coupled to the general purpose computer 610 via the I/O ports 622. In the example of FIG. 6, the general purpose computer 610 is coupled to each of a speaker 624, a display device 630, an input device 632, and an external storage medium 636. The speaker 624 may be implemented using one or more speakers, internal to the computing device 610 or external to the computing device 610, such as in a stereo or surround sound system.

The display device 630 may be a computer monitor, such as a cathode ray tube screen, plasma screen, or liquid crystal display (LCD) screen. The display 630 may receive information from the computer 610 in a conventional manner, wherein the information is presented on the display device 630 for viewing by a user. The display device 630 may optionally be implemented using a touch screen to enable a user to provide input to the general purpose computer 610. The touch screen may be, for example, a capacitive touch screen, a resistive touchscreen, a surface acoustic wave touchscreen, or the like.

The input device 632 may be a keyboard, a mouse, a stylus, drawing tablet, or any combination thereof, for receiving input from a user. The external storage medium 636 may include an external hard disk drive (HDD), an optical drive, a floppy disk drive, a flash drive, solid state drive (SSD), or any combination thereof and may be implemented as a single instance or multiple instances of any one or more of those devices. For example, the external storage medium 636 may be implemented as an array of hard disk drives.

The I/O interfaces 620 facilitate the exchange of information between the general purpose computing device 610 and other computing devices. The I/O interfaces may be implemented using an internal or external modem, an Ethernet connection, or the like, to enable coupling to a transmission medium. In the example of FIG. 6, the I/O interfaces 622 are coupled to a communications network 638 and directly to a computing device 642. The computing device 642 is shown as a personal computer, but may equally be practised using a smartphone, laptop, or a tablet device. Direct communication between the general purpose computer 610 and the computing device 642 may be implemented using a wireless or wired transmission link.

The communications network 638 may be implemented using one or more wired or wireless transmission links and may include, for example, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a mobile telephone cellular network, a short message service (SMS) network, or any combination thereof. The general purpose computer 610 is able to communicate via the communications network 638 to other computing devices connected to the communications network 638, such as the mobile telephone handset 644, the touchscreen smartphone 646, the personal computer 640, and the computing device 642.

One or more instances of the general purpose computer 610 may be utilized to implement a server acting as the content provisioning platform 150 shown in FIG. 1 and described in relation thereto. In such an embodiment, the memory 614 and storage 616 are utilized to store data relating to customers, available inventory as discerned from the inventory provider server 170, and the like. The memory 614 and storage 616 are utilized to store one or more machine learning models to implement the prediction services module 154. Further, the memory 614 and storage 616 are utilized to store a set of rules and/or logic to be applied by the selection engine 153 to filter available inventory and select contextually relevant content to provide to the e-commerce website 120 based on at least one of a context attribute and a consumer attribute. Software for implementing the contextual prediction system is stored in one or both of the memory 614 and storage 616 for execution on the processor 612. The software includes computer program code for implementing method steps in accordance with the method for presenting contextually relevant content described herein.

Embodiments of the present disclosure are not limited to any particular implementation or programming technique and the invention may be implemented using any appropriate techniques for implementing the functionality described herein. Furthermore, embodiments are not limited to any particular programming language or operating system.

Figure 7:
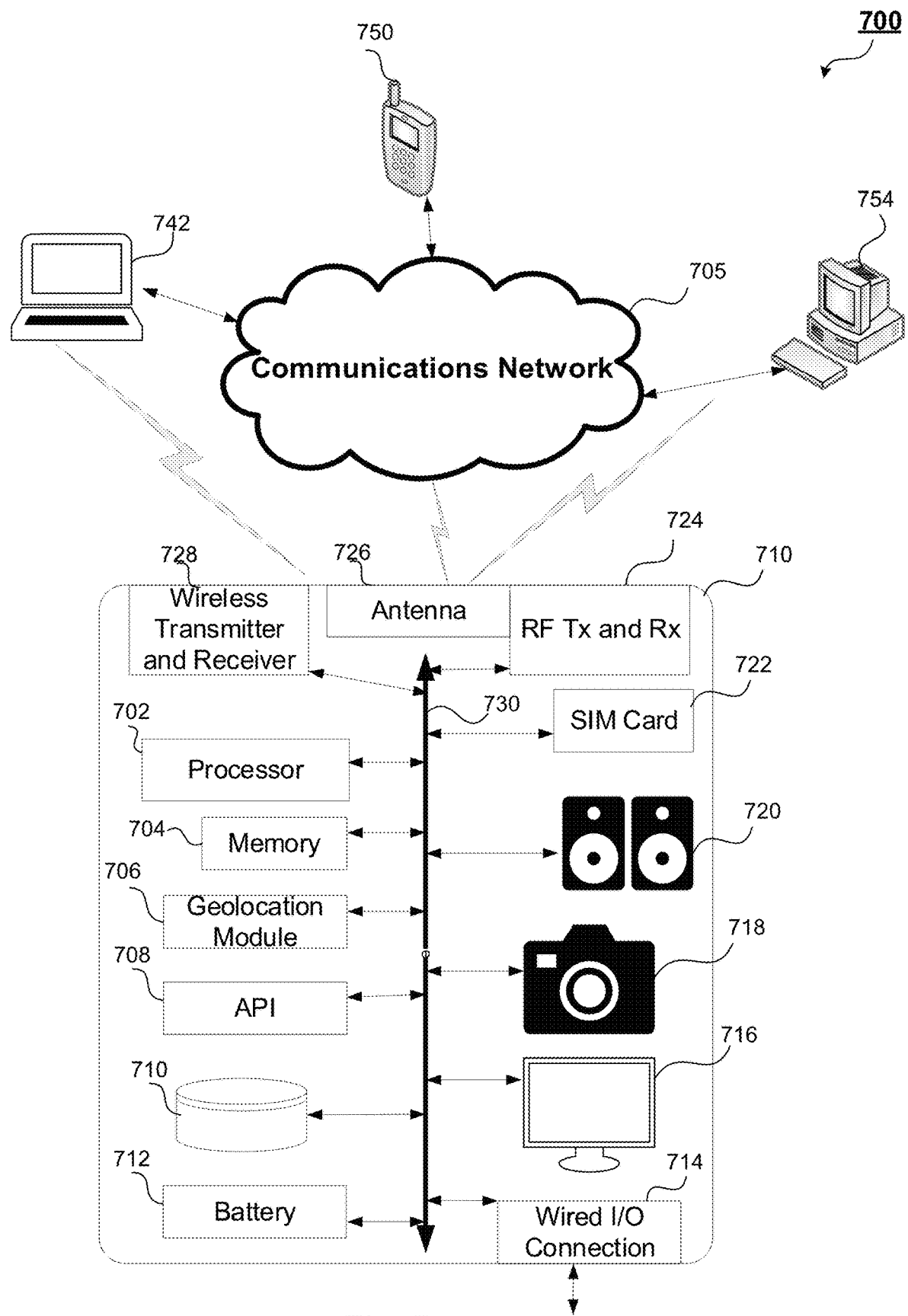
FIG. 7 is a schematic block diagram representation of a system that includes a general smartphone on which one or more embodiments of the present disclosure may be practised.

FIG. 7 is a schematic block diagram representation of a system 700 on which one or more aspects of an multi-order, multi-user method and system of the present disclosure may be practised. The system 700 includes a portable computing device in the form of a smartphone 710, which may be used by a customer to access, browse and interact with the host website 140 of FIG. 1.

The smartphone 710 of FIG. 7 includes a plurality of components, including: a processor 702, a memory 704, a geolocation module 706, an Application Programming Interface (API) module 708, a storage medium 710, a battery 712, a wired input/output (I/O) connection 714, a display screen 716 (such as a capacitive touchscreen), one or more cameras 718, one or more speakers 720, a subscriber identity module (SIM) card 722, a radio frequency (RF) transmitter and receiver 724, an antenna 726, and a wireless transmitter and receiver 728 (such as a Wi-Fi and/or Bluetooth transmitter and receiver). Components of the smartphone 710 generally communicate using one or more bus connections 730 or other connections therebetween.

The wired I/O connection 714 is adapted to couple the smartphone 710 to a power outlet or charging device to recharge the battery 712 or to couple the smartphone to a computing device, such as the general purpose computer 610 of FIG. 6. The wired I/O connection 714 may include one or more connectors and may be adapted to enable uploading and downloading of content from and to the memory 704, storage medium 710 and SIM card 722.

The memory 704 may include Random Access Memory (RAM), Read Only Memory (ROM), or a combination thereof. The storage medium 710 may be implemented as one or more of a solid state "flash" drive, a removable storage medium, such as a Secure Digital (SD) or microSD card, or other storage means. The storage medium 710 may be utilized to store one or more computer programs, including an operating system, software applications, and data. In one mode of operation, instructions from one or more computer programs stored in the storage medium 710 are loaded into the memory 704 via the bus 730. Instructions loaded into the memory 704 are then made available via the bus 730 or other means for execution by the processor 702 to implement a mode of operation in accordance with the executed instructions.

The geolocation module 706 may be used to determine a geographical position of the smartphone 710, such as based on Global Positioning System (GPS) satellites, cellular telephone tower triangulation, or a combination thereof. The determined geographical position may then be made available to one or more programs or applications running on the processor 702 for use within those programs or applications or to be shared to external computing devices and systems.

The wireless transmitter and receiver 728 may be utilized to communicate wirelessly with external peripheral devices via Wi-Fi, Bluetooth, infrared, or other wireless protocol. In the example of FIG. 7, the smartphone 710 is coupled wirelessly to a personal computer 742.

The wireless transmitter and receiver 728 and/or the RF transmitter and receiver 724, in conjunction with the antenna 726, are adapted to couple the smartphone 710 to available communications networks 705. The communications network 705 may be implemented using one or more wired or wireless transmission links and may include, for example, a cellular telephony network, a dedicated communications link, a local area network (LAN), a wide area network (WAN), the Internet, a telecommunications network, or any combination thereof. A telecommunications network may include, but is not limited to, a telephony network, such as a Public Switch Telephony Network (PSTN), a cellular (mobile) telephone cellular network, a short message service (SMS) network, or any combination thereof.

In one implementation, the SIM card in conjunction with the RF transmitter and receiver 724 enable the smartphone 710 to couple to a cellular communications network and then, in turn, to the Internet. Alternatively, or additionally, the smartphone 710 utilizes the wireless transmitter and receiver 728 to couple the smartphone to a local wireless network that is, in turn, coupled to a communications network, such as the Internet. In this way, the smartphone 710 is able to communicate with other computing devices coupled to the communications network 705, such as the second smartphone 750, the personal computer 742, and the personal computer 754.

In one example, the display device 716 is implemented using a liquid crystal display (LCD) screen. The display 716 is used to display content to a user of the smartphone 710. The display 716 may optionally be implemented using a touch screen, such as a capacitive touch screen or resistive touchscreen, to enable a user to provide input to the smartphone 710.

The SIM card 722 is utilized to store an International Mobile Subscriber Identity (IMSI) and a related key used to identify and authenticate the user on a cellular network to which the user has subscribed. The SIM card 722 is generally a removable card that can be used interchangeably on different smartphone or cellular telephone devices. The SIM card 722 can be used to store contacts associated with the user, including names and telephone numbers. The SIM card 722 can also provide storage for pictures and videos. Alternatively, contacts can be stored on the memory 704 or the storage medium 710.

Figure 8:
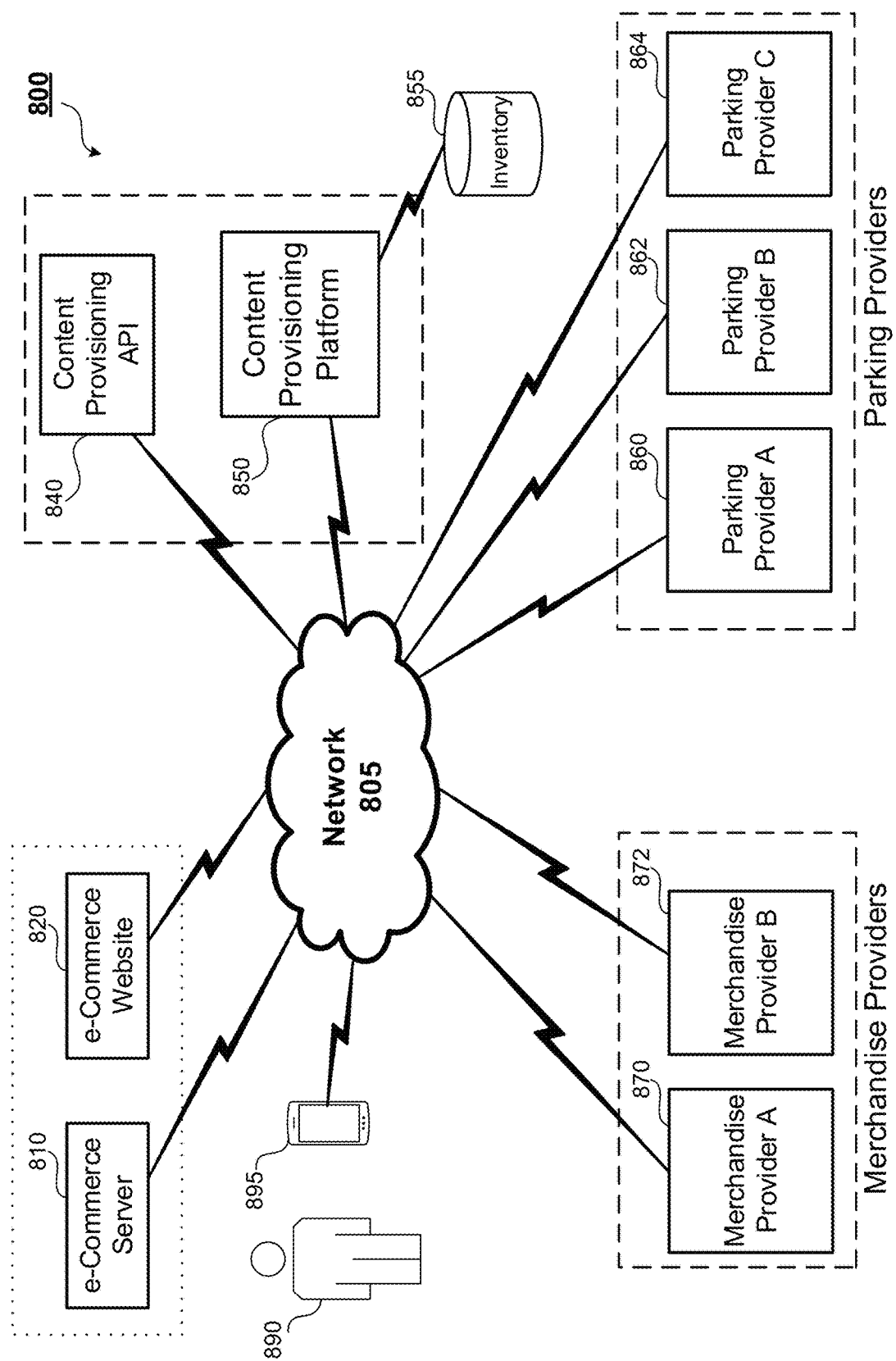
FIG. 8 is a schematic representation of a system on which one or more embodiments of the present disclosure may be practised.

FIG. 8 is a schematic block diagram representation of a contextual prediction system 800 that includes multiple inventory providers. The system 800 includes an e-commerce server 810 that is coupled to a communications network 805. The e-commerce server 810 is a host server that offers products for sale via an associated e-commerce website 820. It will be appreciated that the e-commerce website 820 may be hosted on the e-commerce server 810 or on a separate web-hosting service.

The system 800 also includes a content provisioning platform 850 that is coupled to the communications network 805 and is associated with a content provisioning API 840. The content provisioning platform 850 is configured to source available inventory from one or more inventory providers in order to provide contextually relevant content to the e-commerce website 820 in a dynamic manner during an electronic transaction.

In the example of FIG. 8, the content provisioning system 800 includes a set of parking providers that includes Parking Provider A 860, Parking Provider B 862, and Parking Provider C 864. The content provisioning system 800 also includes a set of merchandise providers that includes Merchandise Provider A 870 and Merchandise Provider B 872. Each of the parking providers 860, 862, 864 and merchandise providers 870, 872 may be implemented in a similar manner to the inventory provider server 170 and inventory provider API 160 of FIG. 1.

The content provisioning system 800 further includes a user 890 that accesses a user computing device 895 to interact with the e-commerce website 820 in order to purchase goods, such as a concert ticket. During the transaction performed by the user 890 in relation to the e-commerce website 820, a webpage served by the e-commerce server 810 to the e-commerce website 820 is encoded in accordance with an SDK associated with the content provisioning platform 850.

The webpage makes a call to the content provisioning API 840, which results in requests to each of the inventory providers 860, 862, 864, 870, 872 to determine the available inventory. The content provisioning platform 850 filters the available inventory, based on an integral selection engine in order to select which of the available inventory to provide to the e-commerce website 820 during the electronic transaction and the manner in which the selected inventory is to be presented to the e-commerce website 820. The selection of the inventory and the manner in which the selected inventory is to be presented is based on at least one of a context attribute associated with the electronic transaction and a consumer attribute associated with the user 890. The content provisioning platform 850 provides the selected inventory to the e-commerce website 820 for display in a widget within the webpage being displayed on the e-commerce website 820. The selected inventory may include zero, one, or more inventory instances, which may be selected from one or more of the inventory providers 860, 862, 864, 870, 872.

Following completion of the electronic transaction on the e-commerce website 820, the e-commerce server 810 provides transaction data to the content provisioning platform 850, wherein the transaction data may be utilized to enhance one or more of a CDP of the content provisioning platform, the prediction services module, and the selection engine. The transaction data may include, for example, an indication of whether the user 890 selected one or more of the selected inventory that was displayed in the webpage on the e-commerce website 820, time spent on that webpage, and any other interactions that the user 890 had with the webpage, including the widget on which the selected inventory was displayed.

The system disclosed herein provides an improved computer system for providing contextually relevant content during an electronic transaction.

INDUSTRIAL APPLICABILITY

The arrangements described are applicable to the information technology and retail industries and particularly for e-commerce.

The foregoing describes only some embodiments of the present invention, and modifications and/or changes can be made thereto without departing from the scope and spirit of the invention, the embodiments being illustrative and not restrictive.

Reference throughout this specification to "one embodiment", "an embodiment," "some embodiments", or "embodiments" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

While some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practised without these specific details. In other instances, well-known methods, structures and techniques have not been shown in detail in order not to obscure an understanding of this description.

Note that when a method is described that includes several elements, e.g., several steps, no ordering of such elements, e.g., of such steps, is implied, unless specifically stated.

In the context of this specification, the word "comprising" and its associated grammatical constructions mean "including principally but not necessarily solely" or "having" or "including", and not "consisting only of". Variations of the word "comprising", such as "comprise" and "comprises" have correspondingly varied meanings.

Similarly, it is to be noticed that the term coupled should not be interpreted as being limitative to direct connections only. The terms "coupled" and "connected," along with their derivatives, may be used. It should be understood that these terms are not intended as synonyms for each other, but may be. Thus, the scope of the expression "a device A coupled to a device B" should not be limited to devices or systems wherein an input or output of device A is directly connected to an output or input of device B. It means that there exists a path between device A and device B which may be a path including other devices or means in between. Furthermore, "coupled to" does not imply direction. Hence, the expression "a device A is coupled to a device B" may be synonymous with the expression "a device B is coupled to a device A". "Coupled" may mean that two or more elements are either in direct physical or electrical contact, or that two or more elements are not in direct contact with each other but yet still co-operate or interact with each other.

As used throughout this specification, unless otherwise specified, the use of ordinal adjectives "first", "second", "third", "fourth", etc., to describe common or related objects, indicates that reference is being made to different instances of those common or related objects, and is not intended to imply that the objects so described must be provided or positioned in a given order or sequence, either temporally, spatially, in ranking, or in any other manner.

Although the invention has been described with reference to specific examples, it will be appreciated by those skilled in the art that the invention may be embodied in many other forms.

We claim:

1. A computer server-implemented content provisioning platform adapted for use in online electronic transactions, said content provisioning platform being coupled to a communications network, the content provisioning platform comprising:
   a selection engine that includes:
      a prediction services module, implemented using a machine learning algorithm, for selecting content from available inventory, based on a likelihood of the consumer to engage with respective inventory,
   wherein said selection engine utilizes said prediction services module to:
      select dynamically in real-time, in response to a request received via said communications network from a webpage associated with an electronic transaction during an electronic transaction checkout process, inventory based on a contextual attribute associated with said electronic transaction and at least one customer attribute associated with a user performing said electronic transaction; and
      determine characteristics of how to present the selected inventory in a graphical user interface (GUI) widget on said webpage; and
   a content rendering module that:
      stores data that determines how content is to be rendered on said e-commerce webpage, said data being selected from the group consisting of campaign meta data, creatives, UX formats, and UX designs; and
      formats said selected inventory for display on said webpage, based on said stored data;
   wherein said inventory is selected from available inventory derived from at least one inventory provider server during the electronic transaction, each said inventory provider server being coupled to said communications network; and
   wherein said webpage is encoded in accordance with a content provisioning application programming interface (API) associated with said content provisioning platform, said webpage is further encoded with a link to a content provisioning software development kit (SDK) associated with said content provisioning platform wherein said link is activated during said electronic transaction to send said request, said webpage including a contextual content display region for displaying said selected inventory utilizing said widget, and said content provisioning API delivering said selected content for display in said contextual content display region.

2. The content provisioning platform according to claim 1,
   wherein said selection engine is further configured to select inventory based on a set of predefined rules stored in a computer-readable storage medium, and further wherein said selection engine includes:
      a targeting rules module for applying a hard filter to said available inventory, based on said set of predefined rules.

3. The content provisioning platform according to claim 1, wherein said machine learning algorithm is one of a linear regression model and a lightGBM model.

4. The content provisioning platform according to claim 2, wherein the set of predefined rules is provided by a server associated with said webpage.

5. The content provisioning platform according to claim 4, wherein the set of predefined rules includes at least one of geographical range, customer type, and product type.

6. The content provisioning platform according to claim 1, wherein said at least one customer attribute is selected from the group consisting of: age, sex, geographical location, computing device type, and browser type.

7. The content provisioning platform according to claim 1, wherein said contextual attributes are selected from the group consisting of: product type, purchase date, purchase time, and product location.

8. The content provisioning platform according to claim 1, wherein said customer attribute relates to an interaction history for the user.

9. The content provisioning platform according to claim 1, wherein determining how to present the selected inventory on said webpage includes at least one of:
   selecting a form of widget to be displayed in said contextual content region of the webpage,
   defining a size of the contextual content region,
   defining co-ordinates on the webpage for where the contextual content region is to be displayed,
   selecting attributes to define a contextually relevant user experience (UX) to the user,
   defining creative text to convey the selected inventory,
   defining graphics to convey the selected inventory, and
   selecting a language to convey the selected inventory.

10. The content provisioning platform according to claim 1, wherein said prediction services module selects content from available inventory further based on a determined value of engagement with said consumer arising from said electronic transaction.

11. An online content provisioning system for use in relation to online electronic transactions, said content provisioning system comprising:
   a computer-implemented server for conducting an electronic transaction with a user via a website, wherein each of said server and said website are coupled to a communications network, said website displaying a webpage encoded in accordance with a content provisioning application programming interface (API) and including a contextual content display region, said webpage being further encoded with a link to a content provisioning software development kit (SDK) associated with said content provisioning platform;
   an inventory provider server coupled to said communications network; and
   a computer-implemented content provisioning platform coupled to said communications network, said content provisioning platform including:
      a selection engine that includes a prediction services module implemented using a machine learning algorithm and configured to:
         in response to a request from said webpage during a checkout process of said electronic transaction, said request being sent in response to said link being activated during checkout process, determine a likelihood of the user to engage with respective inventory based on a contextual attribute associated with said electronic transaction and a customer attribute associated with a user performing said electronic transaction; and select inventory, based on said likelihood, from available inventory derived from said inventory provider server during the electronic transaction; and a content rendering module that:
  stores data that determines how content is to be rendered on said e-commerce webpage, said data being selected from the group consisting of campaign meta data, creatives, UX formats, and UX designs; and
  formats said selected inventory for display on said webpage, based on said stored data; and
  wherein said content provisioning API is associated with said content provisioning platform and enables interaction among said website, said content provisioning platform, and said inventory provider server, and
  further wherein said content provisioning API delivering said selected content for display in said contextual content display region of said webpage.

12. The content provisioning system according to claim 11, wherein said selection engine is further configured to select inventory based on a set of predefined rules stored in a computer-readable storage medium, the selection engine further including:
  a targeting rules module for applying a hard filter to said available inventory, based on said set of predefined rules.

13. The content provisioning system according to claim 11, wherein said prediction services module is implemented using a machine learning algorithm.

14. The content provisioning system according to claim 12, wherein the set of predefined rules is provided by a server associated with said webpage.

15. The content provisioning system according to claim 11, wherein said server presents at least one of transaction data and consumer data to said selection engine, said transaction data including at least one contextual attribute and said consumer data including at least one customer attribute.

16. The content provisioning system according to claim 11, wherein said prediction services module further determines characteristics of how to present the selected inventory in a graphical user interface (GUI) widget on said webpage.

17. The content provisioning system according to claim 16, wherein determining how to present the selected inventory on said webpage includes at least one of:
  selecting a form of widget to be displayed in said contextual content region of the webpage,
  defining a size of the contextual content region,
  defining co-ordinates on the webpage for where the contextual content region is to be displayed, and
  selecting attributes to define a contextually relevant user experience (UX) to the user.

18. The content provisioning system according to claim 11, wherein said prediction services module selects content from available inventory further based on a determined value of
  engagement with said consumer arising from said electronic transaction.

* * * * *